Nov. 28, 1961     B. DUBSKÝ ET AL     3,011,081
FEELER MEMBER FOR TRANSFORMING A MECHANICAL
VALUE INTO AN ELECTRIC VALUE

Filed July 5, 1956     2 Sheets-Sheet 1

INVENTORS
Bořivoj Dubský, Oldřich Straka
BY

United States Patent Office 3,011,081
Patented Nov. 28, 1961

3,011,081
FEELER MEMBER FOR TRANSFORMING A MECHANICAL VALUE INTO AN ELECTRIC VALUE
Bořivoj Dubský and Oldřich Straka, Prague, Czechoslovakia, assignors to Výzkumný a zkušební letecký ústav, Letnany, near Prague, Czechoslovakia
Filed July 5, 1956, Ser. No. 596,005
8 Claims. (Cl. 310—26)

The present invention relates to a feeler member for direct transformation of any desired value, either mechanical, thermal, acoustic, aerodynamic or any other, into an electric value, i.e. into an electromotive force.

There are many methods of transforming a mechanical value into an electric one; there are the so called transmitters which use various physical phenomena such as the variation of resistance, inductance, capacitance and others. Such methods of transformation are usually either simple, the measuring itself requiring however an intricate and sensitive apparatus or on the other hand the method of transformation is intricate and influenced by inaccuracies in manufacture and the measurement is simple. Besides, there are still many instances where a measurement is required which cannot be carried out by the hitherto known methods of transformation either at all or only very unsatisfactorily.

The feeler member for transforming a mechanical value into an electric value according to the present invention comprises a ferromagnetic body of any required shape, which is magnetised by exciting current or made of a permanent magnet, said body being subject to a torsional stress. This torsional stress causes a deformation of the magnetic field producing thereby a component of a magnetic field which induces an electromotive force. This electromotive force is received either by a coil or a conductor.

This method of transformation has, in contradistinction to other known methods, the important feature that in order to obtain an electromotive force it employs a simple exciting as well as receiving device, while the method is a direct one without intermediate stages, which are the cause of inaccuracies and impair the efficiency of the transformation.

The feeler member consists substantially of three parts: an exciting part, a torsional body and a receiving part.

Figure 1:
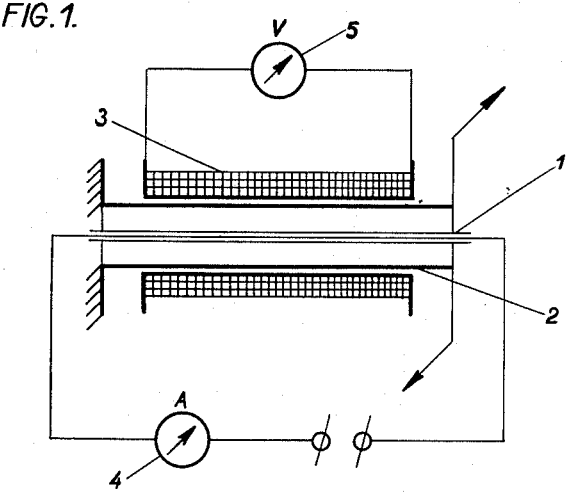
FIG. 1 is a diagrammatic view of a feeler device embodying the present invention.

There are many combinations and ways in which to achieve the transformation of a mechanical value into an electric one according to the present invention. One of the most typical methods is shown diagrammatically in FIG. 1 of the accompanying drawing, wherein the exciting part comprises a conductor 1 loosely passing through the interior of a torsional tube 2. This tube 2 is rigidly clamped at one end and at the other end it is adapted to be stressed by a torque. A receiving coil 3 is freely mounted on the torsional tube 2. The input current is controlled by an amperemeter 4 and the output voltage measured by a voltmeter 5.

An electromagnetic field is produced in the torsional tube 2 under the influence of the electric current flowing through the loose conductor 1 and controlled by the amperemeter 4. When the torsional tube 2 is subject to a torsional stress, the magnetic field becomes deformed. Such deformed magnetic field induces in the coil 3 an electromotive force, which is measured with the voltmeter 5.

Figure 2:
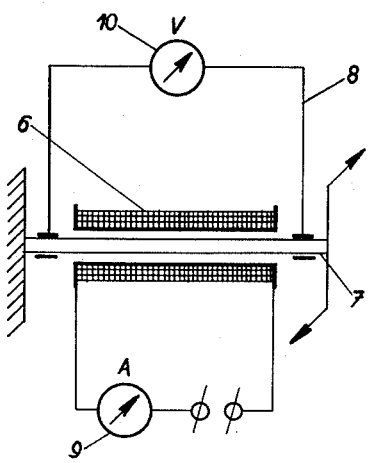
FIG. 2 is a diagrammatic view of another embodiment of the invention.

Another typical example is shown in FIG. 2, where again an exciting coil is freely fitted on a torsional bar 7 which is rigidly clamped at one end and at the other end subject to a torsional stress. The output conductor 8 is directly connected to both ends of the torsional bar 7. The input current is controlled by an amperemeter 9 and the output voltage measured by a voltmeter 10.

The device operates in such a way that an electromagnetic field is produced in the torsional bar 7 under the influence of electric current flowing through the coil 6 and controlled by the amperemeter 9. When the torsional bar 7 is subject to a torsional stress, the magnetic field becomes deformed. Such deformed magnetic field induces in the bar 7 an electromotive force, which is taken off from both ends of the bar 7 and measured by means of a voltmeter 10.

The transforming of a mechanical value into an electromotive force by means of the feeler member according to the present invention consists therefore substantially in deforming the magnetic field in response to a mechanical force, and there are numerous other arrangements in which this principle can be employed.

Figure 3:
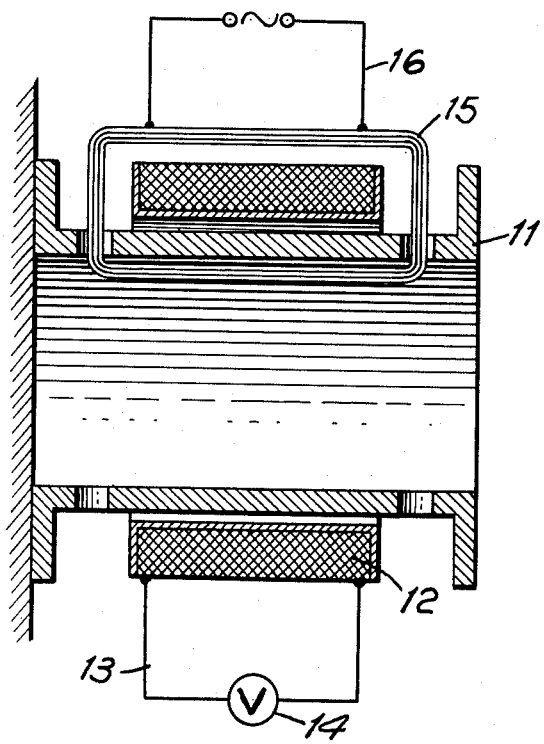
FIG. 3 is a diagrammatic view of still another embodiment of the invention.

Thus, referring to FIG. 3, it will be seen that a device embodying the present invention may include a ferromagnetic, tubular torsional body 11 carrying a receiving coil 12 which is connected to a receiving circuit 13 having a voltmeter 14 interposed therein. An exciting winding 15, which is in the shape of a torroidal coil, surrounds the body 11 and is connected to an exciting circuit 16.

One end of the tubular body 11 is fixed, so that, when a turning moment $Mk$ is applied to the other end, the body 11 is torsionally stressed and the originally cylindrical magnetic field produced in the body 11 by the alternating current flowing through the exciting coil 16 is deformed so as to have a longitudinal component. This longitudinal component of the magnetic field induces an electromotive force in the coil 12 which is indicated in the circuit 13.

Figure 4:
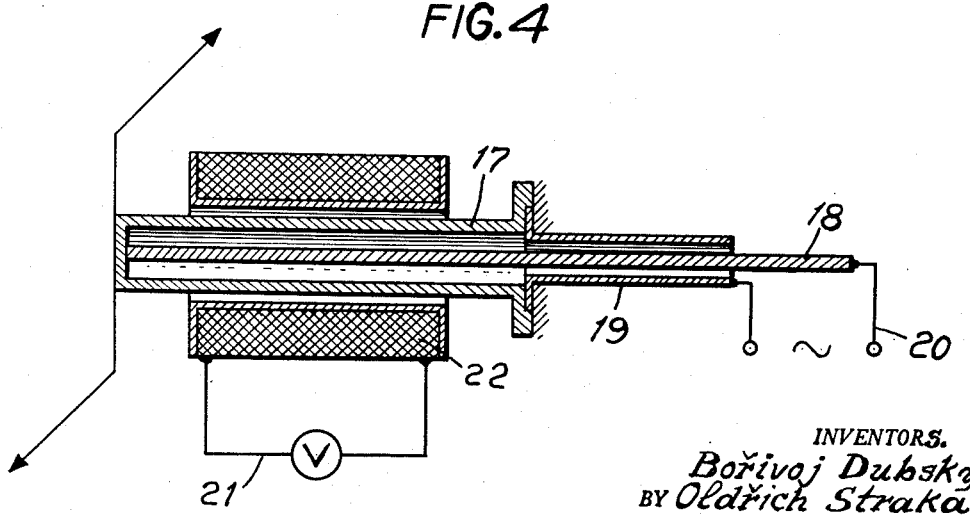
FIG. 4 is a diagrammatic view of a further embodiment of the invention.

Still another embodiment of the invention is illustrated in FIG. 4, wherein the ferromagnetic body 17 is once again tubular, and a straight conductor 18 extends through the body 17 and is connected to the latter at one end. The opposite end of the conductor 18 projects axially from the tubular body 17 and is surrounded by a tube 19 which is electrically connected with the body 17. The ends of the conductor 18 and of the tube 19 which are remote from the tubular body 17 are connected to the exciting circuit 20, while the receiving circuit 21 once again includes a coil 22 on the tubular body 17.

With the arrangement illustrated in FIG. 4, the exciting current flows axially in one direction along the tubular body 17 and returns axially, in the opposite direction, along the conductor 18 so that the magnetic fields produced by the flow of electric current through the body 17 and conductor 18, respectively, tend to cancel each other with respect to the outside, and no induced voltage is normally created in the coil 22. However, when the body 17 is torsionally stressed, the magnetic field produced thereby has a component which is angularly displaced with respect to the field produced by the current flow in conductor 18 so that an electromotive force is thereby produced within the coil 22 which is characteristic of the mechanical force causing torsional stressing of the body 17.

It is apparent that, in each of the above described embodiments of the invention, the exciting and receiving circuits may be reversed.

Usually alternating exciting current is used. Direct current may, however, also be used or even a bar made of a permanent magnet, but in this case the torque must have an alternating component.

It having been found, that the indications of the voltmeter, when the other values are constant, differ when different ferromagnetic materials are used, or when the same materials have undergone different heat treatment, and therefore have a different crystallic structure, with different internal stresses or with a faulty internal structure, the feeler member according to the present invention may successfully be used also for testing these materials without causing any mechanical damage to the materials under test. This application of the present invention makes it possible in mass production to gauge whether the product is within the limits of tolerances as far as the properties of material are concerned, without the product being damaged and excluded from further treatment. According to the experience gained up to now it has been observed that at a certain value of the exciting current a state of "saturation" is established, with the consequence that the magnitude of the electromotive force is no more dependent on the variations of voltage in the exciting part which is a great advantage, as the source need not be stabilised at all.

Within the usable limits, that is, within the limits of Hook's law, the apparatus operates in linear proportions without any measurable hysteresis. The temperature at normal values, as far as it does not increase the Ohmic resistance, has no measurable influence on the transformation either.

The feeler member itself has very small dimensions and may be placed even at most inaccessible points. The devices embodying the invention, as described above, may be used as a dynamometer for measuring the torque on a shaft of a machine, or the device may be designed as a clutch consisting of an insulated tube through which passes current supplied either directly by brushes or by means of a transformer. At the outside there is the torsional bar or tube itself, transmitting the torque, a coil being fitted thereon. The induced current is fed from the coil into an oscilloscope, voltmeter registering apparatus, a relay and the like for further manipulation. Sometimes it is preferable to substitute the measuring coil for the exciting coil. The feeler according to the present invention is therefore adapted for measuring not only the mean value of the torque, but also for following torsional vibrations and registering the same; further it is possible to directly control the regulation of a machine or, when the load of a machine or its release reaches a dangerous degree, the machine may be put out of action by means of a relay. The feeler member may be used for example also in connection with turbines, electromotors, machine tools, mining machines and the like.

The feeler member according to the invention does not place any particular requirements either on the space or on the intricacy of design. A great advantage is its insensitivity to temperature changes within wide limits. The feeler member may further be mounted at an inaccessible point and the measuring apparatus may be placed far from the point where the dynamometer is provided. This device is suitable also for direct measurement of output, i.e. either at constant revolutions without any adaptation whatsoever (only with a suitably arranged scale) or at variable revolutions measured by means of an electric revolution counter, the indication of which represents a current which is in linear proportion to the revolutions, in such a way that this current is fed to one coil of an electrodynamic measuring apparatus and to the other coil of this measuring apparatus the current from the dynamometer, proportionate to the torque, is fed. The indication of the apparatus is then proportional to the product of both currents, i.e. to the product of the torque and revolutions. The apparatus might be suitable for example for motor test plants or may be relatively simply used in addition to revolution counters even for aircraft, where the output is an important factor for following the operation of the motor and condition of the aircraft, which up to now has not been measured.

In another way the feeler member can be used when measuring the stress of the roots of propeller blades, where up to now all methods of measurement have encountered great difficulties. The present invention facilitates substantially the solution of this problem. It is possible to follow not only the mean value of the torque but also torsional vibrations of the root of the blades. The apparatus does not place any particular demands on the construction or design.

Also tensometric receivers may be arranged in such a way that the tension on the surface of the material is transmitted into twisting of the torsional bar and further transformation into electromotive force is carried out according to the present invention.

In general it is possible to measure temperature, vibrations, intensity of sound, moments of a hinged rudder etc. where in all cases the measured pulse is transformed into twisting of a torsional bar and this again is further transformed according to the invention.

The advantages of direct measurement techniques practiced in accordance with the principles of the present invention are many and these techniques may preferably be used, for example, when measuring the force in an aerodynamic tunnel, whereby it is possible to follow and register with any desired accuracy even nonstationary flow-phenomena.

Having now particularly described and ascertained the nature of our said invention, and in what manner the same is to be performed, we declare that what we claim is:

1. A device for providing an accurate electrical indication of a mechanical force, comprising an elongated ferromagnetic body which is torsionally stressed by the mechanical force to be indicated, means other than said body operative to magnetize said body to the state of saturation so as to eliminate hysteresis, and a receiving circuit including a conductor in the magnetic field of the normally cylindrically magnetized body operative to carry an electric current in response to torsional stressing of said body causing deformation of the normally cylindrical magnetic field, which current is accurately proportional to the value of the mechanical force producing the stressing.

2. A device as in claim 1; wherein said elongated body is initially cylindrically magnetized, and said conductor of the receiving circuit is in the form of a solenoidal pick-up coil on said elongated body.

3. A device as in claim 2; wherein said elongated body is tubular, and said means operative to cylindrically magnetize said body includes an electric conductor extending axially through said tubular body, and means for passing a sufficient exciting current through the last mentioned conductor to effect said saturation, whereby the electric current carried by said receiving circuit is substantially independent of variations in the voltage of the exciting current.

4. A device as in claim 1; wherein said means operative to cylindrically magnetize said body includes a solenoidal coil extending around said elongated body so that the latter is initially magnetized only axially, and said conductor of the receiving circuit is formed, at least in part, by said elongated body.

5. A device as in claim 1; wherein said means operative to cylindrically magnetize said elongated body includes an exciting circuit having a torroidal coil surrounding at least a part of said body.

6. A device as in claim 1; wherein said elongated body is tubular, and said means operative to cylindrically magnetize said body includes a straight conductor extending axially in said tubular body and joined to the latter at one end, the other end portion of said straight conductor projecting axially from said tubular body, a tube surrounding said other projecting end portion of the straight conductor and being electrically connected to said body, and electric exciting means connected to said straight conductor and to said tube at ends thereof remote from said tubular body so that current for cylindrically magnetizing said tubular body flows in opposite directions through said tubular body and said straight conductor.

7. In combination, in an apparatus for providing an accurate electrical indication of a mechanical force, tubular torsional ferromagnetic member means, means rigidly securing one end of said member means, said member means being torsionally stressed by the mechanical force to be indicated, electrically energized means symmetrically disposed with respect to the main axis of said member means for normally magnetizing said member means to saturation, and electrical indicating circuit means responsive to torsional stressing of said member means and the resulting deformation of the magnetization of said member means for providing an electrical current which is proportional to the mechanical force producing said deformation and independent of voltage variations in said electrically energized means magnetizing said member means.

8. In an apparatus for providing an accurate electrical indication of a mechanical force, the combination of an elongated ferromagnetic member which is torsionally stressed by the mechanical force to be indicated, exciting circuit means including an electrical conductor operatively associated with said elongated member and through which a sufficient electric current passes for magnetizing said elongated member to saturation thereby to avoid hysteresis as well as changes in the flux of said magnetization in accordance with variations in the voltage of said exciting circuit means, and electrical indicating circuit means responsive to the torsional stressing of said elongated member and the consequent deformation of said magnetization to provide an electrical indicating current accurately proportional to the value of the mechanical force producing said torsional stressing.

References Cited in the file of this patent
UNITED STATES PATENTS

| | | |
|---|---|---|
| 2,471,542 | Rich | May 31, 1949 |
| 2,572,313 | Burns | Oct. 23, 1951 |
| 2,854,593 | Hobrough | Sept. 30, 1958 |
| 2,876,419 | Gianola et al. | Mar. 3, 1959 |

OTHER REFERENCES

"Glossary of Physics" by LeRoy D. Weld, 1st ed., 2d Impression, 1937, pp. 142 and 152. McGraw-Hill Book Co. Inc., New York.